US012167197B2

(12) United States Patent
Shumard et al.

(10) Patent No.: US 12,167,197 B2
(45) Date of Patent: Dec. 10, 2024

(54) AUDIO DEVICES HAVING MULTIPLE STATES

(71) Applicant: Shure Acquisition Holdings, Inc., Niles, IL (US)

(72) Inventors: Brent Robert Shumard, Mount Prospect, IL (US); Walter Timothy Harwood, Streamwood, IL (US); Michael Knappe, West Bloomfield, MI (US)

(73) Assignee: Shure Acquisition Holdings, Inc., Niles, IL (US)

( * ) Notice: Subject to any disclaimer, the term of this patent is extended or adjusted under 35 U.S.C. 154(b) by 129 days.

(21) Appl. No.: 17/528,667

(22) Filed: Nov. 17, 2021

(65) Prior Publication Data

US 2022/0159374 A1 May 19, 2022

Related U.S. Application Data

(60) Provisional application No. 63/115,450, filed on Nov. 18, 2020.

(51) Int. Cl.
*H04R 1/40* (2006.01)
*H04R 1/34* (2006.01)

(52) U.S. Cl.
CPC ............. *H04R 1/406* (2013.01); *H04R 1/345* (2013.01); *H04R 2201/025* (2013.01)

(58) Field of Classification Search
CPC ... H04R 1/406; H04R 1/345; H04R 2201/025
USPC .......................................... 381/92, 334, 331
See application file for complete search history.

(56) References Cited

U.S. PATENT DOCUMENTS

| | | | | |
|---|---|---|---|---|
| 4,224,469 | A | 9/1980 | Karson | |
| 5,818,924 | A * | 10/1998 | King | H04M 1/605 455/575.8 |
| 8,243,961 | B1 | 8/2012 | Morrill | |
| 9,226,088 | B2 | 12/2015 | Pandey et al. | |
| 2013/0170684 | A1 * | 7/2013 | Nicholson | H04R 5/04 381/334 |
| 2013/0272097 | A1 * | 10/2013 | Kim | G06F 3/04883 367/129 |
| 2015/0010186 | A1 | 1/2015 | Larsen | |

* cited by examiner

*Primary Examiner* — Vivian C Chin
*Assistant Examiner* — Douglas J Suthers
(74) *Attorney, Agent, or Firm* — Banner & Witcoff, Ltd.

(57) ABSTRACT

An audio device may be configured to have multiple modes of operation. The mode of the device may be associated with a particular geometric configuration of the device, such as by swiveling an arm of the device and/or changing the orientation of the device with respect to gravity and/or a surface (e.g., table) on which the device rests. The device may determine the appropriate state based on the current geometry, and based on the state may tune the device for a particular operation suited for that geometry. For example, different signal processing parameters may be applied, different microphones may be enabled and disabled, and/or different acoustic conditions may be provided (for example, different modes of a passive radiator) based on the mode.

19 Claims, 9 Drawing Sheets

AUDIO DEVICES HAVING MULTIPLE STATES

CROSS-REFERENCE TO RELATED APPLICATIONS

The present application claims priority to U.S. Provisional Patent Application Ser. No. 63/115,450, filed Nov. 18, 2020, hereby incorporated by reference as to its entirety for all purposes.

BACKGROUND

Portable audio devices, such as speakerphones, portable speakers (e.g., smart speakers and/or BLUETOOTH speakers), often have a small form factor. The small size of these devices may present a variety of challenges.

For example, such small audio devices that include both speakers and microphones can also experience high acoustic coupling between the speakers and the microphones. This can result in undesirable distortion and feedback. Moreover, devices are often designed for a single use case, such as to be used as a personal speakerphone or as a speakerphone suitable for a larger group in a conference room, or as a personal/portable speaker). These devices often have particular types of microphones (e.g., an omnidirectional microphone or a highly directional microphone) depending upon the intended purposes of the device. If the device is used in a situation for which it is not intended, the device may not perform well and may even be rendered effectively useless. For example, a personal speakerphone may have a directional microphone that is not suitable for group conference settings, and a group conference speakerphone may have an omnidirectional microphone that would pick up too much undesirable background noise when used in a personal speakerphone situation.

SUMMARY

The following summary presents a simplified summary of certain features. The summary is not an extensive overview and is not intended to identify key or critical elements.

There is a desire to implement an audio device that can function in different ways for different situations, such as a speakerphone that functions as a high-fidelity listening device as well. Aspects described herein may provide a device with multiple states (device modes) of operation. The device modes may be selected based on a current (and dynamically changeable) geometric configuration of the device, such as by swiveling an arm of the device and/or changing the orientation of the device with respect to gravity and/or a surface (e.g., table) on which the device rests. The device may determine the appropriate state based on the current geometry, and based on the state properly tune the device for the intended purpose of that geometry. Multi-state signal processing may be useful in any case where the geometry and acoustic conditions are functionally different from state to state, such as when switching the use case of a device between a personal speakerphone and a group speakerphone, or between a personal speakerphone and a portable speaker (e.g., a portable BLUETOOTH speaker). The states may be differentiated by different acoustic echo cancellation (AEC) starting conditions, differing microphone selection, differing speaker equalizations, differing low-frequency (LF) boost and or any other acoustic or signal processing characteristics, and/or differing enabling and disabling of speakers, microphones, passive radiators, and/or other elements.

This may improve performance of the device on a case-by-case basis depending on the configuration of the device. For example, there may be two or more fixed, mutually exclusive physical states that may have associated signal processing tailored to the state and providing various different signal processing parameters and/or functionality based on the device mode, such as pre-seeded AEC, dynamic speaker signal conditioning, and/or microphone equalization. This concept may also extend to using a continuous, dynamic system with continuous, dynamic changes to these device characteristics, rather than being limited to discrete states. In addition to or alternatively to varying signal processing parameters and/or functionality, the two or more device states (or continuous range of device states) may also vary other functional and/or physical operating characteristics of the device, such as enabling, disabling, or otherwise modulating the characteristics of a passive radiator and/or other acoustic structure, and/or enabling, disabling, and/or otherwise modulating one or more microphones, speakers, and/or other physical and/or functional elements of the device.

For example, according to some aspects, an apparatus may be provided that comprises a speaker and a passive radiator configured to receive acoustic waves produced by the speaker. In a first mode of the apparatus, the passive radiator may be enabled. In a second mode of the apparatus, the passive radiator may be disabled.

According to further aspects, an apparatus may be provided that comprises a main body comprising a speaker, an acoustic structure, and a moveable portion connected to the main body. The moveable portion may be configured to move with respect to the main body, while remaining connected to the main body, between at least a first position in which the apparatus is in a first mode and a second position in which the apparatus is in a second mode. The acoustic structure may be enabled in the first mode and disabled in the second mode.

According to further aspects, an apparatus may be provided that comprises a main body. The main body may comprise a first microphone and a speaker. A moveable portion may comprise a second microphone and may be connected to the main body and configured to move with respect to the main body while remaining connected to the main body. The apparatus may be configured such that movement of the moveable portion causes the apparatus to switch between a first mode and a second mode. The apparatus may be configured to enable the first microphone and disable the second microphone when in the first mode, and to disable the first microphone and enable the second microphone when in the second mode.

These and other features and potential advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
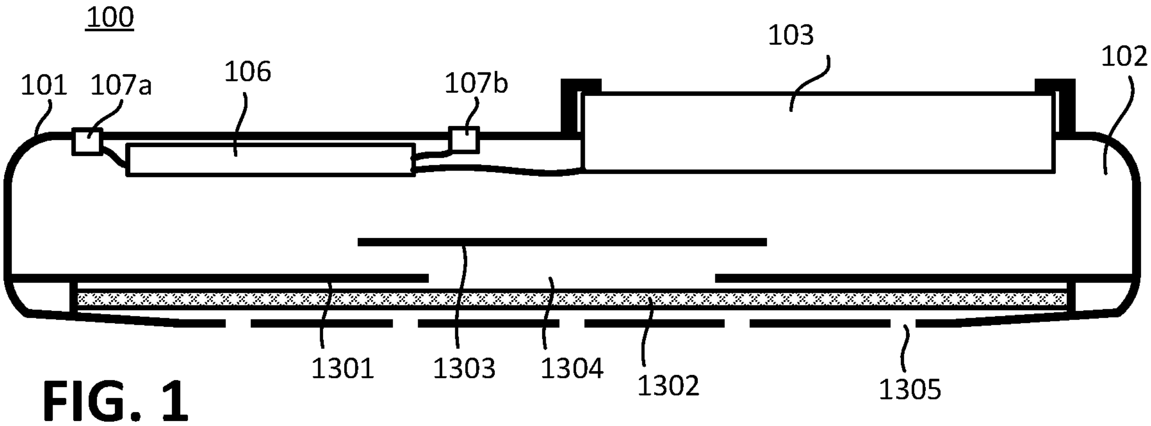
FIG. 1 is a side view of an example device comprising a speaker, two microphones, and a mechanically configurable passive radiator.

The accompanying drawings, which form a part hereof, show examples of the disclosure. It is to be understood that the examples shown in the drawings and/or discussed herein are non-exclusive and that there are other examples of how the disclosure may be practiced.

Figure 2:
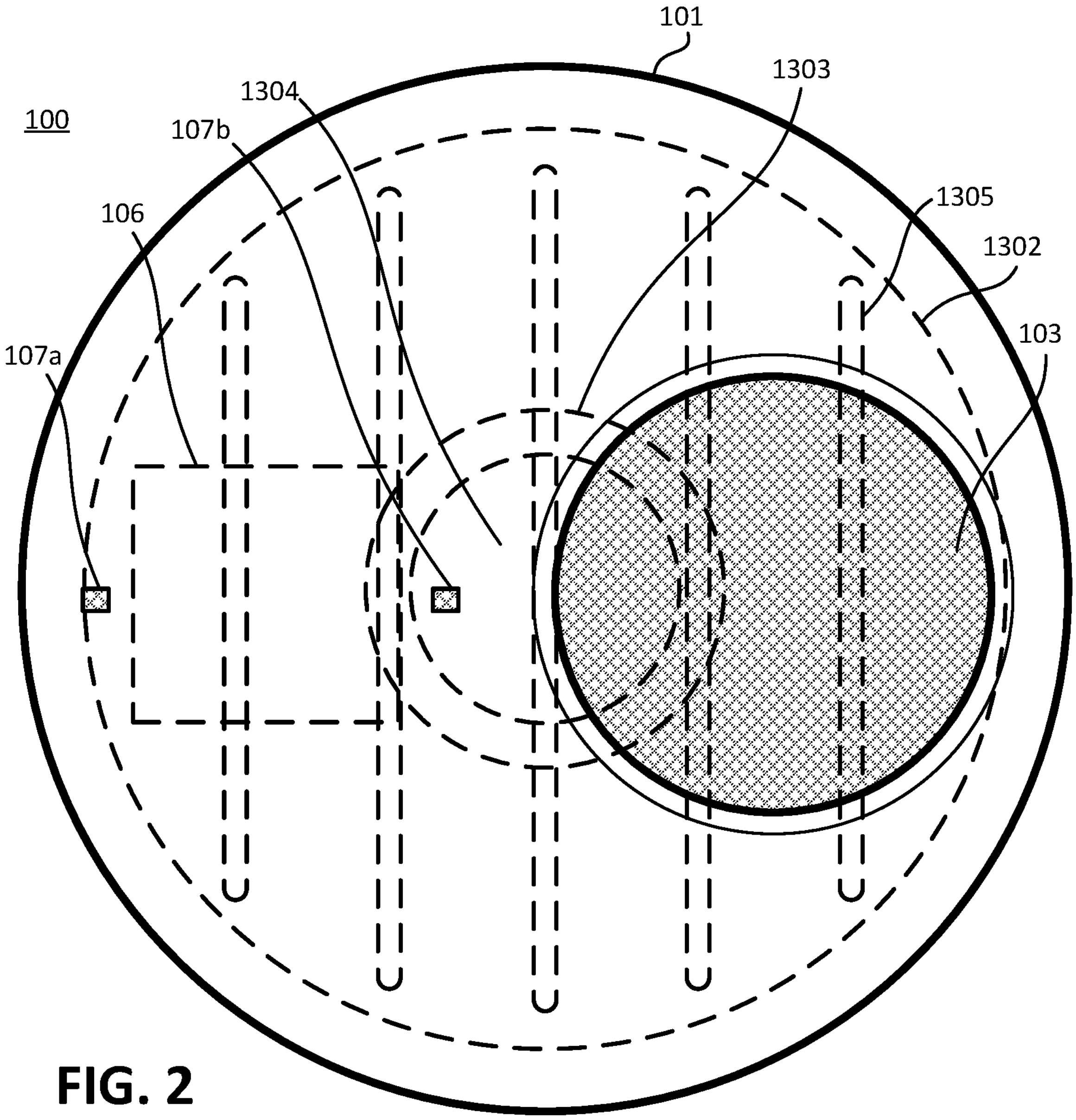
FIG. 2 is a top view of the device of FIG. 1.

FIG. 1 is a side view of an example device 100, and FIG. 2 is a top view of device 100, looking in the downward direction of FIG. 1. Device 100 as shown comprises one or more speaker drivers (in this example, speaker driver 103) and one or more microphones (in this example, microphones 107*a* and 107*b*). Device 100 may further comprise a housing 101 (which may also be a main body of device 100) that holds driver 103 and one or more of the microphones 107*a* and 107*b*, and which may partially or fully enclose a controller 106 electrically connected with driver 103 and microphones 107*a* and 107*b*.

Controller 106 may control the operations of device 100, including the operations of driver 103 and/or microphones 107*a* and 107*b*. For example, controller 106 may receive electrical signals produced by microphones 107*a* and 107*b* in response to (and representative of) sounds detected by microphone 107*a* and/or 107*b*), and process those received electrical signals in any desired manner, such as by storing data representing the detected sounds in memory, or sending communications to a location external to device 100 representing the detected sounds. Controller 106 may further include circuitry for generating signals representing sounds to be emitted by driver 103. For example, controller 106 may receive electrical signals from a location outside device 100 and cause sounds to be emitted by driver 103 based on those signals. Such communications external to device 100 may be conducted via one or more electrical wires (such as a USB connection) and/or via a wireless connection such as Wi-Fi or cellular communications. In the latter case, controller 106 may include a wireless communication module such as a Wi-Fi communication module, cellular network communication module, and/or a BLUETOOTH communication module. Controller 106 may be implemented as, for example, a computing device that executes stored instructions, and/or as hard-wired circuitry that may or may not executed stored instructions.

While driver 103 may be directed so as to primarily direct sound outward from device 101 (e.g., in a generally upward direction in FIG. 1), driver 103 may further emit sound in at least a rearward direction, into a rear enclosed cavity 102 defined by housing 101. A driver without a rear cavity (e.g., a free air driver) generally radiates sound inefficiently because the driver is radiating in both the forward and backward directions equally, which sums to zero in the far field. The housing behind a driver typically sets the radiation conditions, and the size of the rear cavity enclosed by the housing affects the air stiffness rearward of the driver. To optimize forward radiation by the driver, then, enclosed cavity 102 may be suitable for collecting and containing rearward sound radiated into housing 101 from the interior (rearward) facing portion of driver 103. By capturing the rearward radiated sound, enclosed cavity 102 ideally has a geometry that appropriately sets the rearward air stiffness and damping experienced by the system to be at a critical point, such that sound primarily radiates only (or at least mostly) from the exposed (front) surface of the driver. However, as explained above, it may be difficult to fit a cavity of the required geometry (e.g., size and/or shape) into a portable audio device.

One way to implement a rear cavity is to include resonating tubes therein, which force the sound from the rear of the driver to travel via a particular acoustic path within the enclosure. In some cases, the rear cavity may be fully sealed (no acoustically significant openings). In other cases, the rear cavity may have one or more openings, called ports. In further cases, the rear cavity may have a passive radiator that flexes in response to acoustic energy, thereby dynamically changing the acoustic response of the rear cavity over time in a desirable way.

FIG. 1 also shows a passive radiator 1302 (or other acoustic structure) located internal to housing 101, although passive radiator 1302 may alternatively be integrated into and part of housing 101. Device 100 in this example also has a wall 1301 at least partially separating cavity 102 into two chambers, where the first (upper) chamber is in direct air communication with driver 103 and the second (lower) chamber is in direct air communication with passive radiator 1302. Wall 1301 may have at least one opening 1304 that may be selectively coverable (or otherwise selectively closeable) by a moveable structure 1303, such as a plate, that will be generally referred to herein as a valve, because it may function to effectively open and close opening 1304 to selectively allow or not allow direct air communication between the first and second chambers. In FIG. 1, valve 1303 is shown as being in an open configuration (in which opening 1304 is acoustically open), such that sound emitted from the rear of driver 103 into cavity 102 is readily received by passive radiator 1302. However, valve 1303 may be placed in a closed configuration (in which opening 1304 is acoustically closed) such that the two chambers are substantially acoustically disconnected from each other and passive radiator 1302 does not receive the acoustic energy (or at least receives significantly less acoustic energy, not enough to be effective as a passive radiator) from driver 103. Thus, valve 1303 may be used to selectively enable and disable passive radiator 1302, or to otherwise selectively modulate the effectiveness of passive radiator 1302. Device 100 in this example may also have one or more openings 1305 in housing 101 to allow passive radiator 1302 to communicate with the air outside of housing 101 and prevent passive radiator 1302 from pressurizing when absorbing acoustic energy. However, the one or more openings 1305 may also not be included if a closed cavity is desired surrounding passive radiator 1302.

Figure 3:
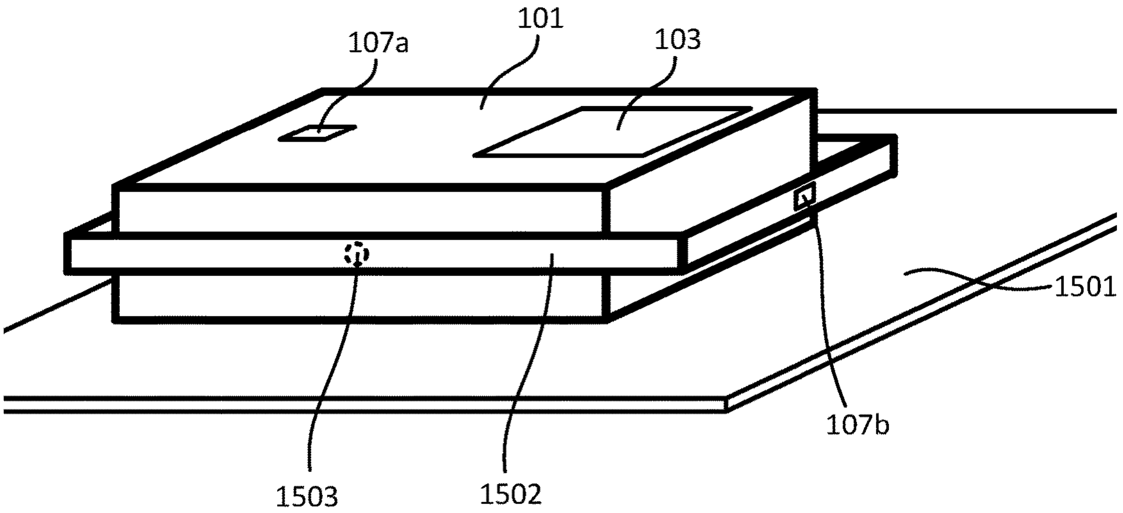
FIG. 3 is a perspective view of an example device comprising a speaker, two microphones, and a mechanically configurable passive radiator, wherein the device is in a first configuration of a plurality of potential configurations.

FIG. 3 shows yet another example of device 100, in which microphone 107*b* may be located on an arm 1502 or other structure external to housing 101. Arm 1502 may be moveable with respect to housing 101. For example, arm 1502 may swivel about an axle 1503 that may extend all of the way through housing 101 and connect both the sides of arm 1502 to housing 101. As shown in FIG. 3, device 100 will be considered to be in a first configuration in which arm 1502 is in the shown angle relative to housing 101. To help understand the perspective view of FIG. 3, device 100 is shown resting on top of a surface 1502 such as a table surface. In the shown configuration, microphone 107*a* is directed upward and microphone 107*b* is directed laterally.

Figure 4:
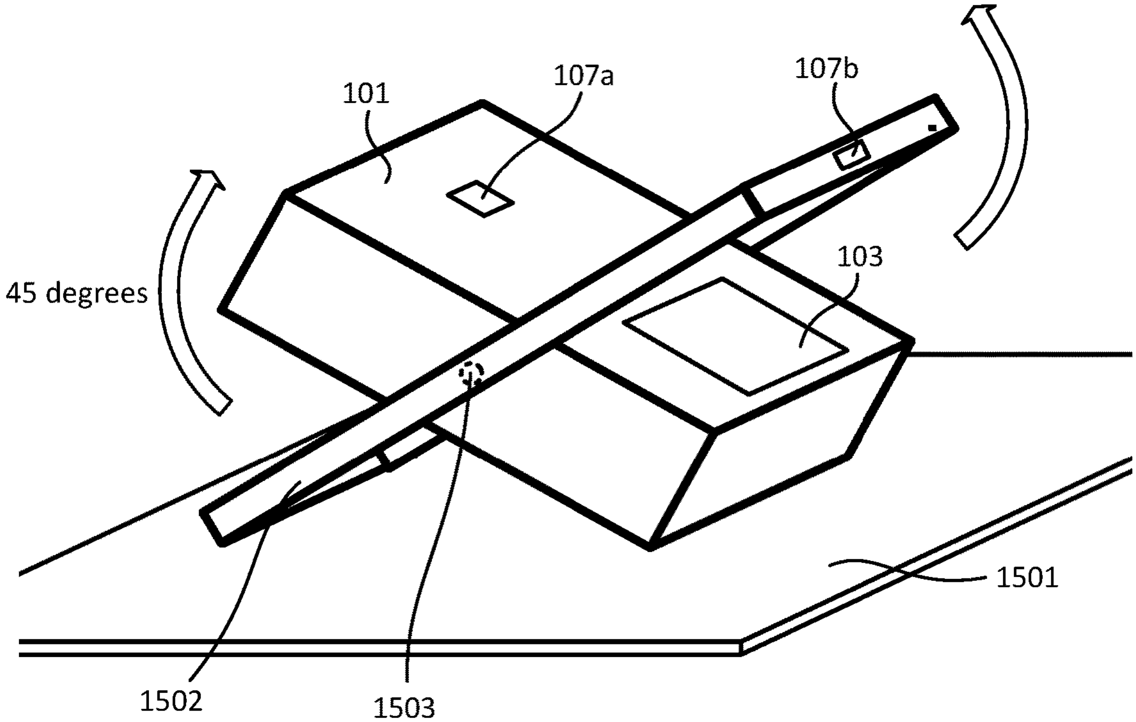
FIG. 4 is a perspective view of the device of FIG. 3, wherein the device is in a second configuration if a plurality of potential configurations.

FIG. 4 shows the device 100 of FIG. 3, except that arm 1502 and/or housing 101 has been moved relative to one another so as to be at a different relative angle. In the shown example, arm 1502 has rotated counter-clockwise relative to housing 101, and/or housing 101 has rotated clockwise relative to arm 1502. In such a configuration, arm 1502 and housing 101 may support device 100 on surface 1501 so as to naturally rest at an angle to surface 1501, in a slightly upright position. In this shown configuration, each of microphone 107*a* and microphone 107*b* is pointed partially upward and partially laterally. In the shown configuration, housing 101 has been angled approximately 45 degrees relative to surface 1501. However, housing 101 and arm 1502 may be swiveled relative to each other so as to cause housing 101 to be at any desired angle relative to surface 1501. Moreover, device 100 may be able to swivel at an essentially infinite number of angles within some possible a range of angles, or it may be able to only be stable to be held in a finite number of angled configurations, such as at two different angles (e.g., flat and raised such as shown in FIGS. 3 and 4) or at three different angles, or at four different angles, etc.

Figure 5:
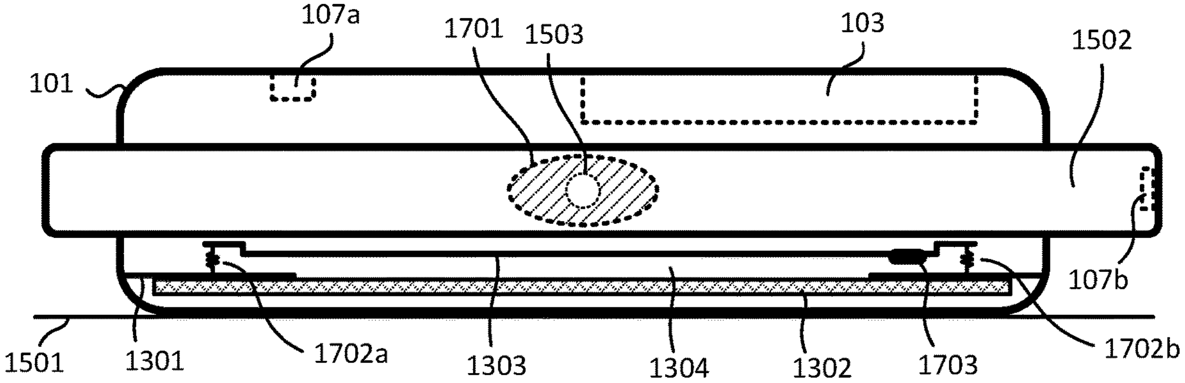
FIG. 5 is a side view of another example device comprising a speaker, two microphones, and a mechanically configurable passive radiator, wherein the device is in a first configuration.
Figure 6:
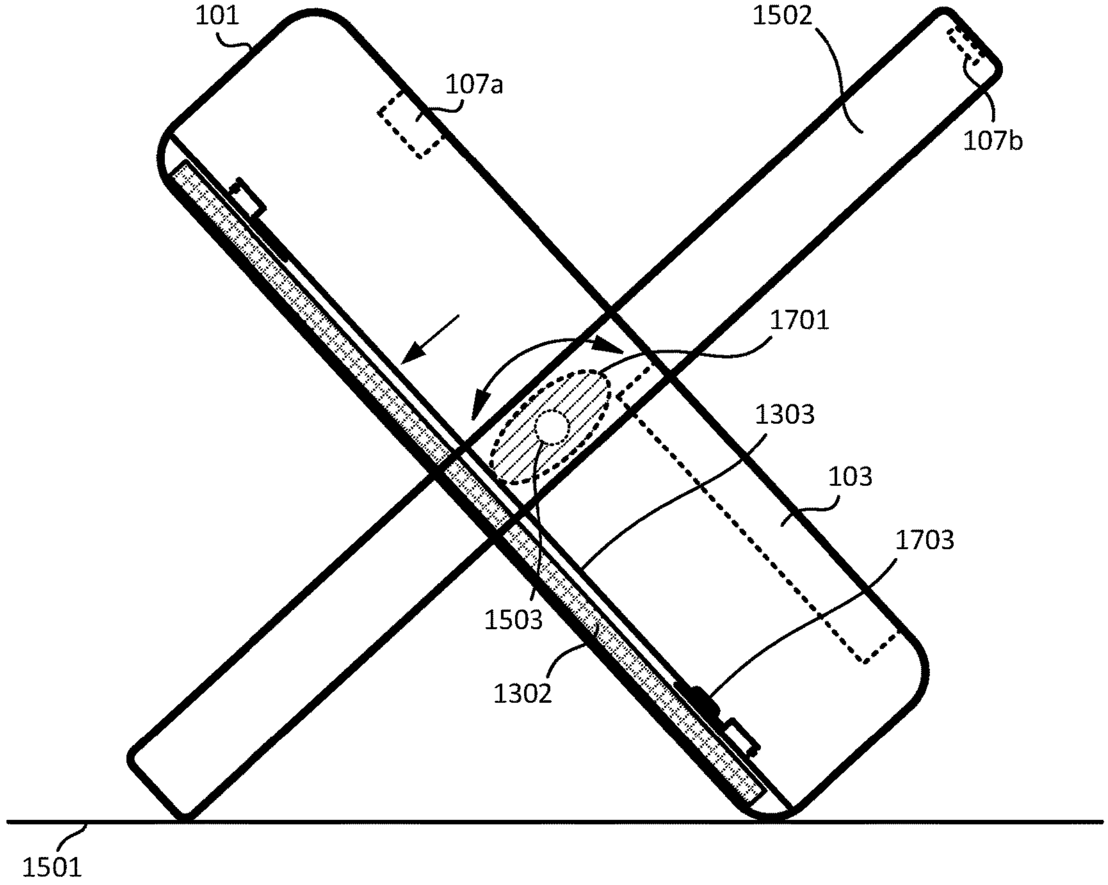
FIG. 6 is a side view of the device of FIG. 5, wherein the device is in a second configuration.

FIG. 5 shows a side view of an example of device 100. While this example may include controller 106, it is not shown for easier viewing of the other features in the drawing. While the shape of housing 101 may look slightly different than in FIGS. 3 and 4, device 100 of FIG. 5 may be the same device 100 as shown in FIGS. 3 and 4. Here, device 100 may include a cam 1701 connected to axle 1503 within cavity 102. When arm 1502 rotates relative to housing 101, axle 1503 may be fixedly attached to arm 1502, and so this would cause axle 1503 to rotate along with arm 1502. Cam 1701, in turn may be fixedly attached to axle 1503. Thus, rotating of arm 1502 may cause cam 1701 to also rotate. As shown in FIG. 5, when cam 1701 is in a first rotated position, it may not push onto valve 1303. In this configuration, plate 1303 may be naturally raised up away from opening 1304 (and thus allowing sound from driver 103 to easily reach passive radiator 1302) by one or more springs such as springs 1702*a* and 1702*b*. If one were to view this device from top, there may be additional springs 1702 dispersed around a perimeter of valve 1303. As shown in FIG. 6, when arm 1502 is rotated relative to housing 101, this causes cam 1701 to rotate along with arm 1502 and push onto valve 1303, thereby closing valve 1303 and effectively disabling passive radiator 1302.

Device 100 may also have a sensor that detects the position of valve 1303. For example, device 100 as shown in FIGS. 5 and 6 may include a sensor 1703 that is mechanically coupled with valve 1303 such that sensor 1703 rests freely when valve 1303 is open (as in FIG. 5) and is pressed when valve 1303 is closed (as in FIG. 6). Sensor 1703 may produce an electrical signal that may be read by controller 106 (not shown to maintain clarity of features to be discussed with respect to FIGS. 5-6). The electrical signal may be represented as a voltage and/or a current, and/or may be digitally encoded. Sensor 1703 may be any type of sensor suitable for detecting the position of valve 1303, such as but not limited to a button (which is pressed when valve 1303 is closed) or other type of bi-state switch, a multi-state switch (e.g., tri-state for three positions of arm 1502), or a potentiometer or radial encoder for measuring a much larger number of states (arm positions) or even up to an infinite number of states (arm positions). Controller 106 may detect the signal (e.g., the voltage or current produced or modified by sensor 1703), which may directly or indirectly represent the arm position, and determine the arm position and/or whether valve 1303 is open or closed or in any position in between (e.g., halfway closed) if that is desired.

Based on this information from sensor 1703, controller 106 may selectively cause one or more microphones and/or speaker drivers to be enabled or disabled, and/or to change a signal processing characteristic (e.g., a signal processing mode) for processing sound received by a microphone or produced by a driver. For example, in the device configuration of FIG. 5, controller 106 may determine, using sensor 1703, that valve 1303 is open, and cause microphone 107*a* to be enabled and microphone 107*b* to be disabled. And, when device 100 is placed in the configuration of FIG. 6, controller 106 may determine, using sensor 1703, that valve 1303 is now closed, and cause microphone 107*a* to be disabled and microphone 107*b* to be enabled. Thus, device 100 may effectively have multiple modes of operation. An example of two modes of operation are shown below in Table 1 (where AEC refers to acoustic echo canceling and LF boost refers to low-frequency boost). It is noted that Table 1 is merely one example; in addition to different combinations of the conditions listed therein and a different number of device modes (e.g., three or more) being possible, there are many additional functionality that may be modified based on device mode, such as but not limited to microphone equalization, speaker equalization, speaker limiter parameters, multi-band compression parameters, input noise reduction, and/or other signal processing parameters.

TABLE 1

Example Device Modes

| Device Mode | Passive Radiator 1302 | Microphone 107a | Microphone 107b | Signal Processing |
|---|---|---|---|---|
| 1 (angled upright position, e.g., as shown in FIGs. 4, 6, 8, 12, 14) | disabled (valve 1303 is closed) | disabled | enabled | AEC disabled or tuned to a first setting; LF boost disabled or tuned to a first setting |

TABLE 1-continued

| Example Device Modes | | | | |
|---|---|---|---|---|
| Device Mode | Passive Radiator 1302 | Microphone 107a | Microphone 107b | Signal Processing |
| 2 (flat position, e.g., as shown in FIGs. 1, 2, 3, 5, 7, 9, 11, 13) | enabled (valve 1303 is open) | enabled | disabled | AEC enabled or tuned to a second setting; LF boost enabled or tuned to a second setting; dynamic limiter |

As shown in the table above, AEC and/or LF boost may be selectively enabled or disabled, or may be tuned to a particular setting (e.g., tuned to a particular geometry of the housing/arm combination) based on the device mode. This may be useful, for example, if one of the device modes is used primarily for operating device 100 as a music speaker (e.g., a BLUETOOTH speaker) or group speakerphone (e.g., mode 1) and another of the device modes is used primarily for operating device 100 as a personal speakerphone mode (e.g., mode 2). As also shown in the example of Table 1 above, different microphones and/or speakers may be enabled or disabled based on the device mode. For example, microphone 107*a* may be an omnidirectional microphone and microphone 107*b* may be a directional microphone. In such a case, in device mode 1, device 100 may, for example, be useful as a personal device that is angled up and pointed at the user, in which arm 1502 is used as a rest for propping device 100 up at an angle (such as in FIG. 6), directional microphone 107*b* is enabled, omnidirectional microphone 107*a* is disabled, digital signal processing is set for directional microphone 107*b* and/or speaker driver 103 in a desired manner for a personal device use case (e.g., AEC is disabled or tuned to a first setting, and/or LF boost is disabled or tuned to a first setting), and/or passive radiator 1302 is disabled. However, in device mode 2, device 100 may, for example, be useful as a speakerphone for a larger group of users that is positioned flat on the table (such as in FIG. 5), omnidirectional microphone 107*a* is enabled, directional microphone 107*b* is disabled, digital signal processing is set for omnidirectional microphone 107*a* and/or speaker driver 103 in a desired manner for a speakerphone use case (e.g., AEC is enabled or tuned to a second setting, LF boost is enabled or tuned to a second setting, and/or a dynamic limiter setting is applied), and/or passive radiator 1302 is enabled.

The modes shown in Table 1 are merely examples. There may be any number of modes, such as three modes, four modes, or more. Moreover, any of the device mode settings in Table 1 may be swapped between the two modes. For example, in device mode 1 microphone 107*a* may be enabled and microphone 107*b* may be disabled, and in device mode 2 microphone 107*a* may be disabled and microphone 107*b* may be enabled. In other cases, both microphones may be used in both modes, or only a single microphone may be provided and used for both modes. And, while AEC and LF boost are listed in Table 1, these are only examples of signal processing characteristics; any other signal processing characteristics may be changed from device mode to device mode.

Also, there may not be distinct (discrete) device modes and rather there may be a gradual spectrum of functionality changing with device 100 geometry. For example, as arm 1502 is swiveled with respect to housing 101, valve 1303 may gradually open or gradually close, and signal processing functions such as AEC and/or LF boost may be gradually tuned to different settings. In such a case, sensor 1703 may be able to detect a continuous set of positions (or a large number of discrete positions), such as a potentiometer is able to do.

Moreover, while a mechanical way of changing the state of valve 1303 is described herein (using cam 1701), alternatively device 100 may comprise a motor (such as a stepper motor or servo motor) that controller 106 may drive to electrically open and close valve 1303 based on the signal that controller 106 receives from sensor 1703.

Figure 7:
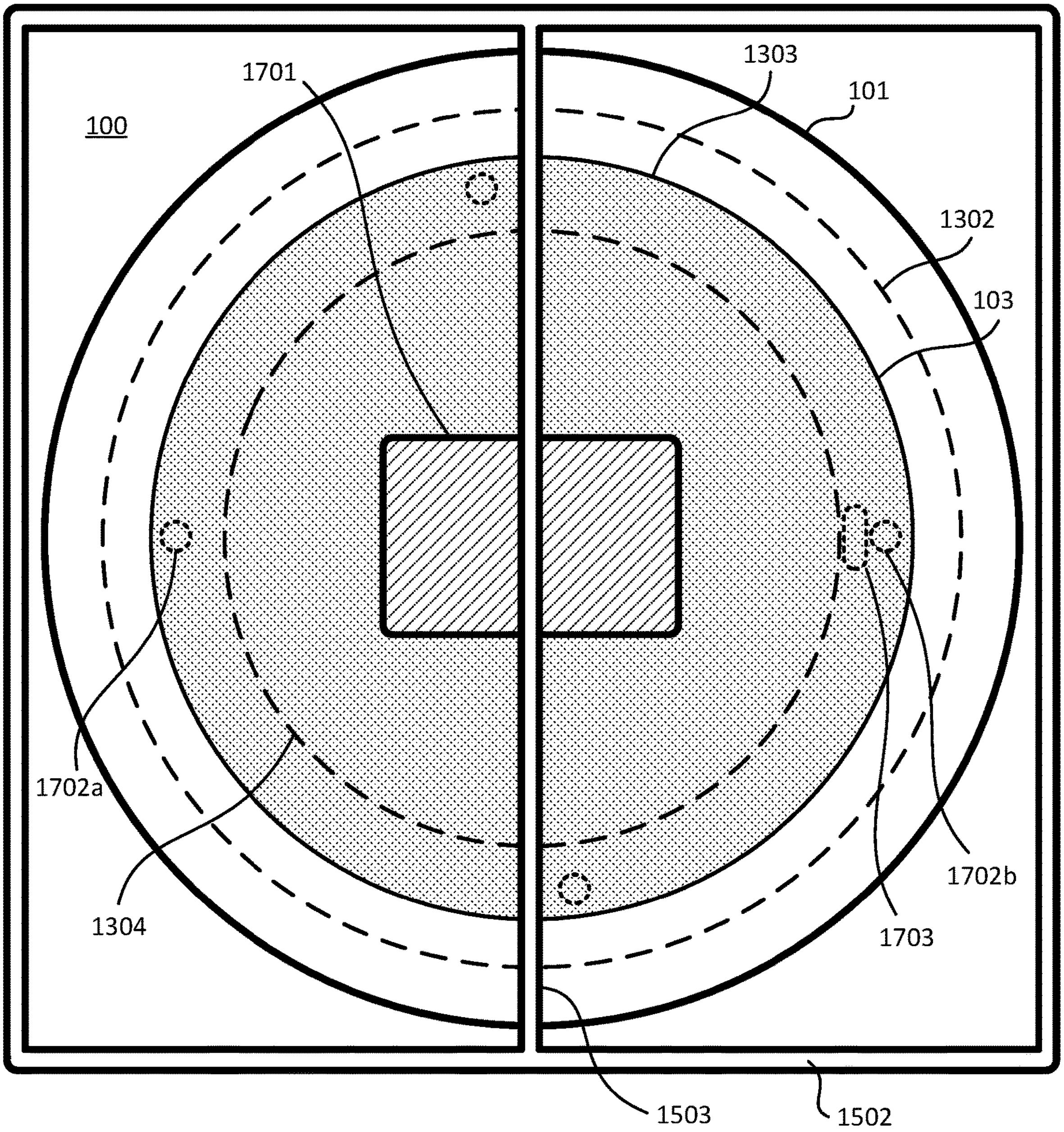
FIG. 7 is a top view of the device of FIG. 5 in the first configuration.
Figure 8:
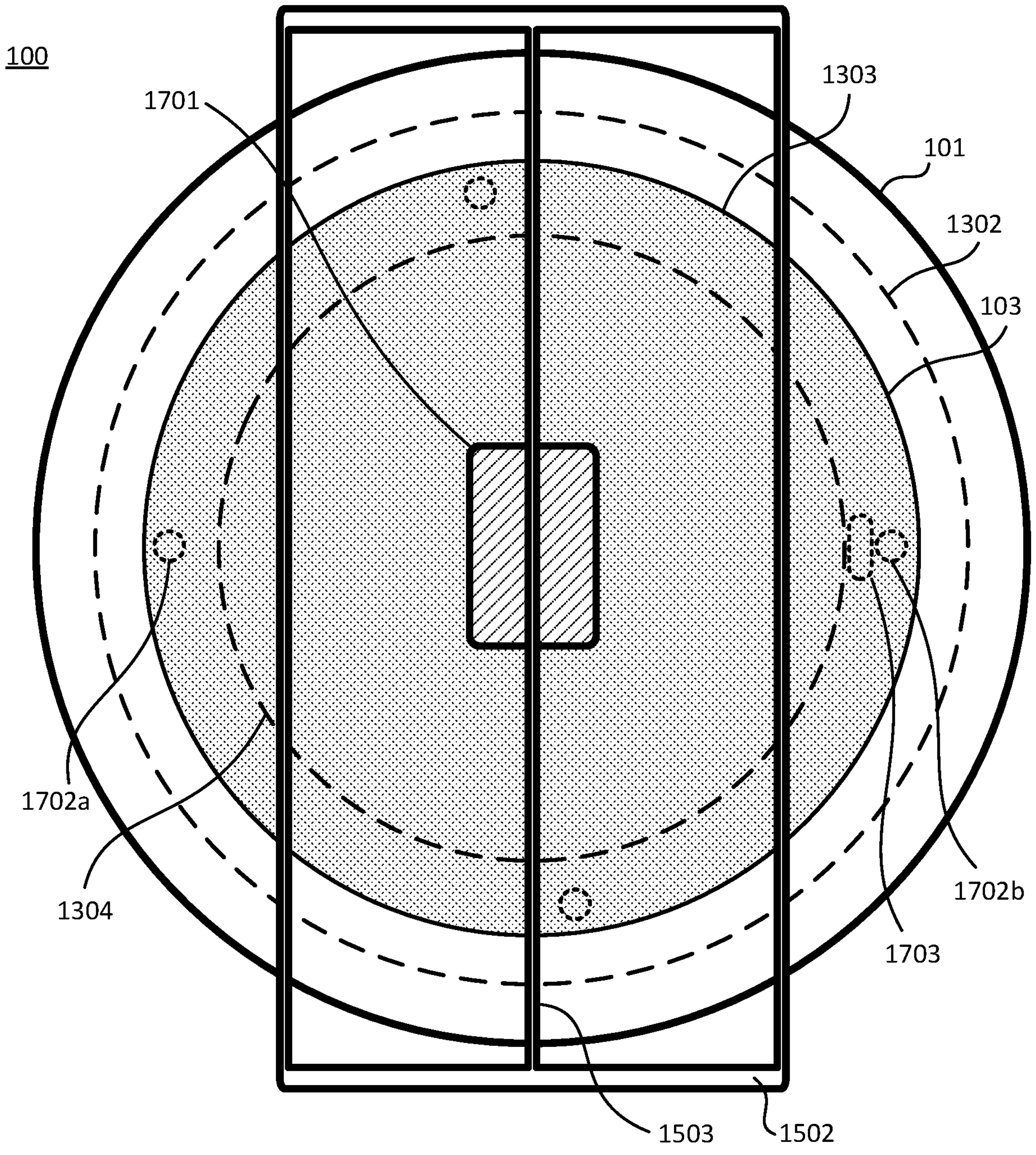
FIG. 8 is a view from the top of the device of FIG. 6 in the second configuration.

FIGS. 7 and 8 are top-down views of FIGS. 5 and 6, respectively, with the top surface of housing 101 removed for clarity, and with driver 103 and microphones 107*a* and 107*b* not shown, for easier viewing of the other features in the drawing. While referred to as a top-down view, FIG. 8 is more precisely described as showing the device from a point of view that is orthogonal to the where top surface of housing 101 would be angled such that this point of view shows the same housing 101 profile shape as in FIG. 7. While housing 101, valve 1303, and passive radiator 1302 are shown in these figures as having circular shapes, they may have any other shape as desired, such as oval, rectangular, etc.

In this example of device 100 and in any other of the examples described herein, any of the microphones (e.g., microphone 107*a* and microphone 107*b*) may be any type of microphones desired, including but not limited to omnidirectional microphones, directional microphones, dynamic microphones, condenser microphones, ribbon microphones, cardioid microphones, micro-electro-mechanical system (MEMS) microphones, etc. Moreover, where multiple microphones are used in the same device, the multiple microphones may be of different types or of the same type as each other. For example, in the same device 100, microphone 107*a* may be a cardioid microphone while microphone 107 may be an omnidirectional microphone, or vice-versa.

Figure 9:
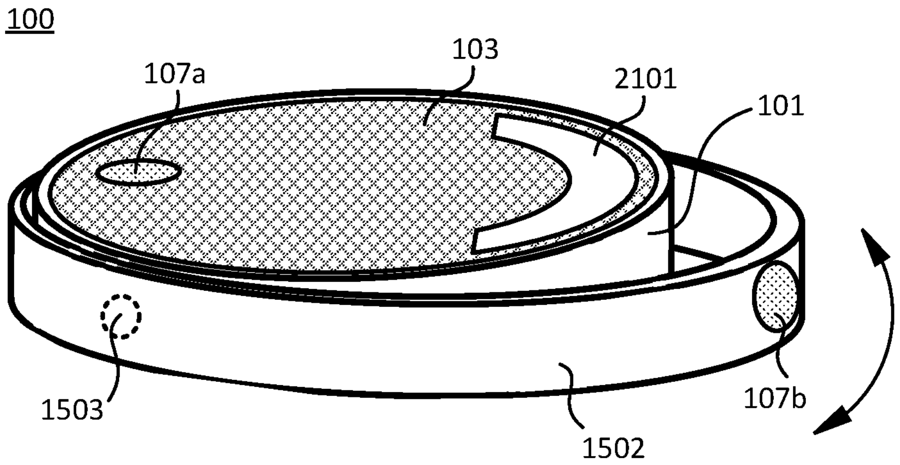
FIG. 9 is a perspective view of another example device comprising a speaker, two microphones, and a mechanically configurable passive radiator, wherein the device is selectable between a plurality of configurations including at least a first configuration and a second configuration.

FIG. 9 shows a perspective view of yet another example of device 100. As in the other examples, arm 1502 may be swiveled with respect to housing 101. This example also shows a user interface device 2101 that is accessible by a person from outside housing 101. User interface device 2101 may be any type of user interface, such as one or more buttons, switches touch-sensitive surfaces, indicator lights (e.g., LEDs), displays, and/or the like. Another way that the device mode of device 100 may be modified is in accordance with input via user interface device 2101. For example, in addition to or instead of swiveling arm 1502 to select a particular device mode, a person may select a particular device mode by pressing a button or changing a switch position. While user interface device 2101 is shown on the top surface of device 100, and particularly overlaid at least partially over driver 103, user interface device 2101 may be located anywhere on housing 101. In other cases, device 100 (in any of the examples) may be responsive to a user interface that is physically remote from device 100. For example, device 100 may be responsive to a user inputs via an app on a cell phone that is wirelessly paired with device 100 via BLUETOOTH, Wi-Fi, or a cellular network. Also, while user interface device 2101 is not explicitly shown in the figures for other examples of device 100, any of the other examples of device 100 may include user interface device 2101.

Figure 10:
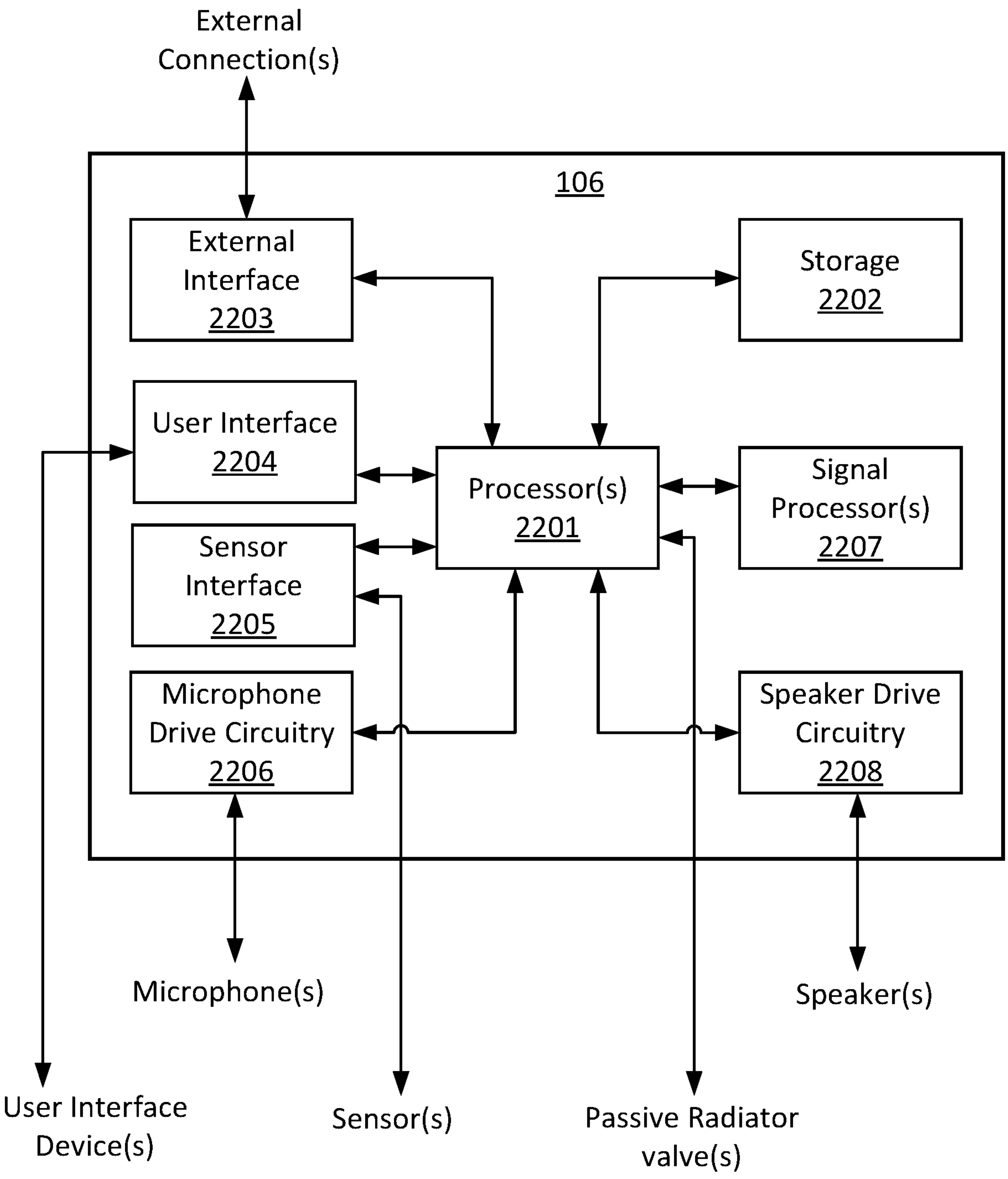
FIG. 10 is a block diagram showing an example configuration of a computing device, which may be used to implement at least part of any of the devices described herein, such as controller 106.

FIG. 10 shows an example block diagram of controller 106. Controller 106 may be implemented as, for example, a computing device that executes stored instructions, and/or as hard-wired circuitry that may or may not execute stored instructions. In the shown example, controller 106 may comprise or be connected to any of the following: one or more processors 2201, storage 2202 (which may comprise one or more computer-readable media such as memory), an external interface 2203 (which may be, or be connected to, a communication module such as described previously), a user interface 2204 (e.g., which may be, or may drive, user interface device 2101 of FIG. 9), a sensor interface 2205 connected with sensor 1703, microphone drive circuitry 2206 configured to receive audio information signals from one or more microphones of device 101 (such as microphones 107, 107*a*, and/or 107*b*), one or more digital signal processors 2207 configured to implement any digital signal processing of device 100 such as AEC and/or LF boost, and/or speaker drive circuitry 2208 configured to provide audio signals to one or more drivers of device 101 (such as speaker 103), and to cause the one or more drivers to produce sound.

The one or more processors 2201 may be configured to execute instructions stored in storage 2202. The instructions, when executed by the one or more processors 2201, may cause controller 106 (and thus device 100) to perform any of the functionality described herein performed by controller 106 and/or device 100. For example, the instructions may cause controller 106 to configure the one or more signals processors 2207 to enable, disable, and/or change settings for various digital signal processing functions such as AEC and/or LF boost, based on device mode. As another example, the instructions may cause controller 106 to enable or disable any microphones (and/or speaker drivers) based on device mode. The instructions may cause controller 106 to determine the current device mode based on signals received from sensor 1703 via sensor interface 2205, and/or based on signals received from user interface device 2101 via user interface 2204, in the manner described herein.

Power may be provided to controller 106, driver 103, microphones 107, 107*a*, and/or 107*b*, sensor 1703, and/or any other elements of device 100 as appropriate. While not explicitly shown, any of the example devices 100 described and illustrated herein may include an internal battery and/or an external power connection.

Figure 11:
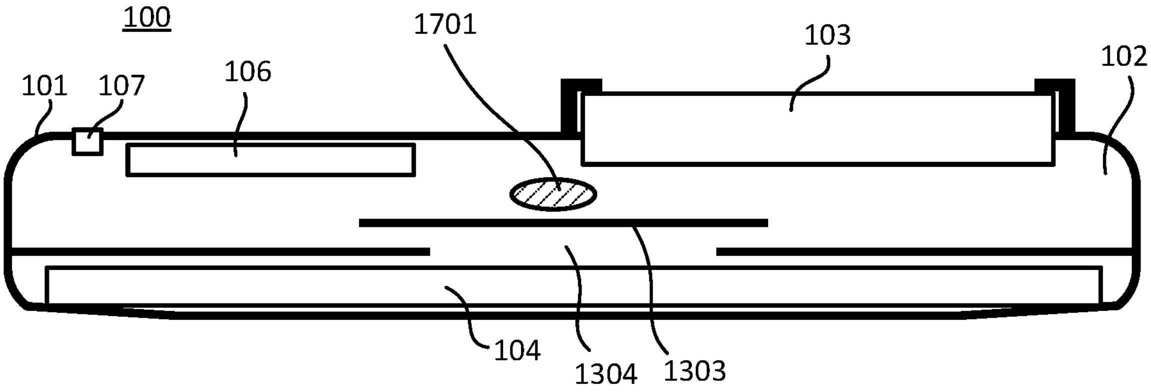
FIG. 11 is a side view of an example device comprising a speaker, a microphone, and a mechanically configurable acoustic structure, in a first configuration.
Figure 12:
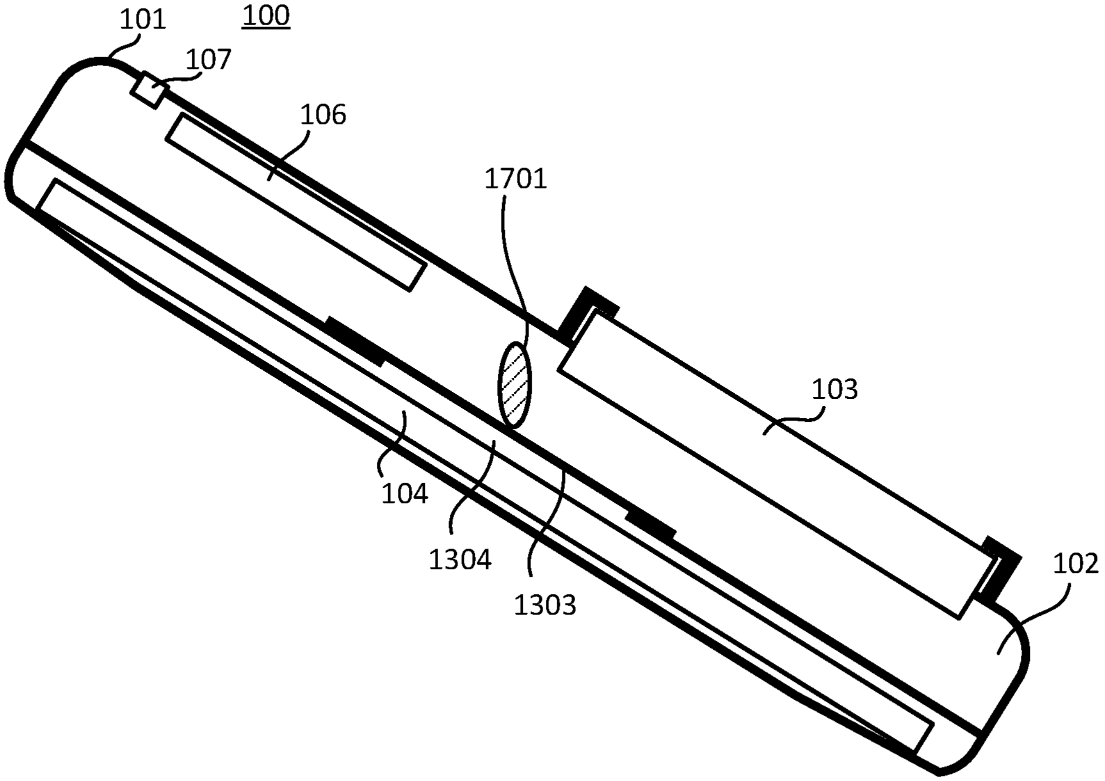
FIG. 12 is a side view of the device of FIG. 11 in a second configuration.

FIGS. 11 and 12 are side views of another example of device 100 in first and second device modes, respectively. In this example, device 100 comprises an acoustic structure 104, where valve 1303 may be configured to selectively either allow acoustic energy from driver 103 to freely enter acoustic structure 104 via opening 1304 or substantially block the acoustic energy from entering acoustic structure 104. Acoustic structure 104 may be any type of device that modifies acoustic energy, and may include one or more passageways, volumes, paths, ports, reflecting portions, absorbing portions and/or other features that operate to modify acoustic energy during its passage through, absorption of, and/or reflection by, acoustic structure 104. Non-limiting examples of acoustic structure 104 include a passive radiator, an acoustic filter (as opposed to an electrical signal filter), an acoustic reflector, an acoustic absorber (e.g., a dampener), etc. This, like the operation of valve 1303 with respect to passive radiator 1302, may allow device 100 to selectively enable or disable the function of acoustic structure based on device mode (e.g., based on device geometry and/or user input via user interface device 2101). Thus, at least one device mode may enable acoustic structure 104, and at least one other device mode may disable acoustic structure 104. For example, if acoustic structure 104 is an acoustic filter, then the acoustic filter may be selectively enabled and disabled (or otherwise modulated) based on device mode. Or, if acoustic structure 104 is a dampener, then acoustic dampening may be selectively enabled and disabled (or otherwise modulated) based on device mode.

Figure 13:
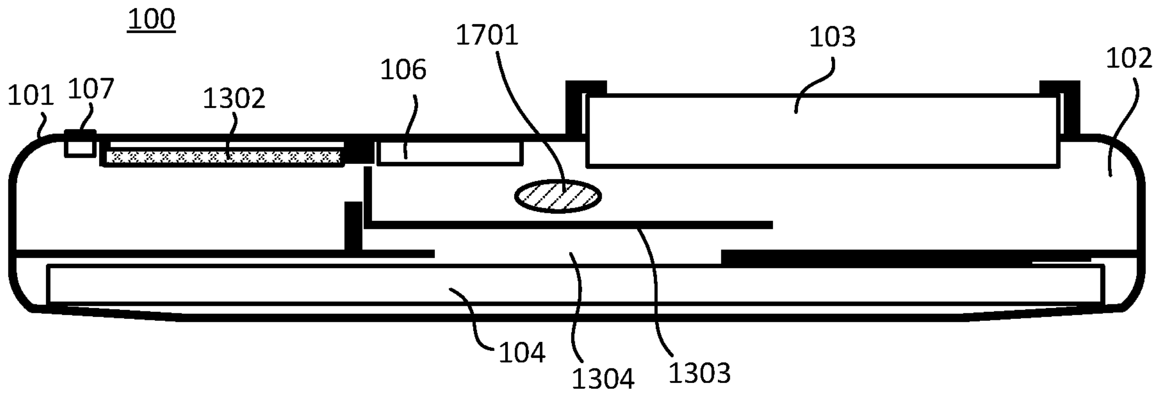
FIG. 13 is a side view of an example device comprising a speaker, a microphone, a mechanically configurable passive radiator, and a mechanically configurable acoustic structure, in a first configuration.
Figure 14:
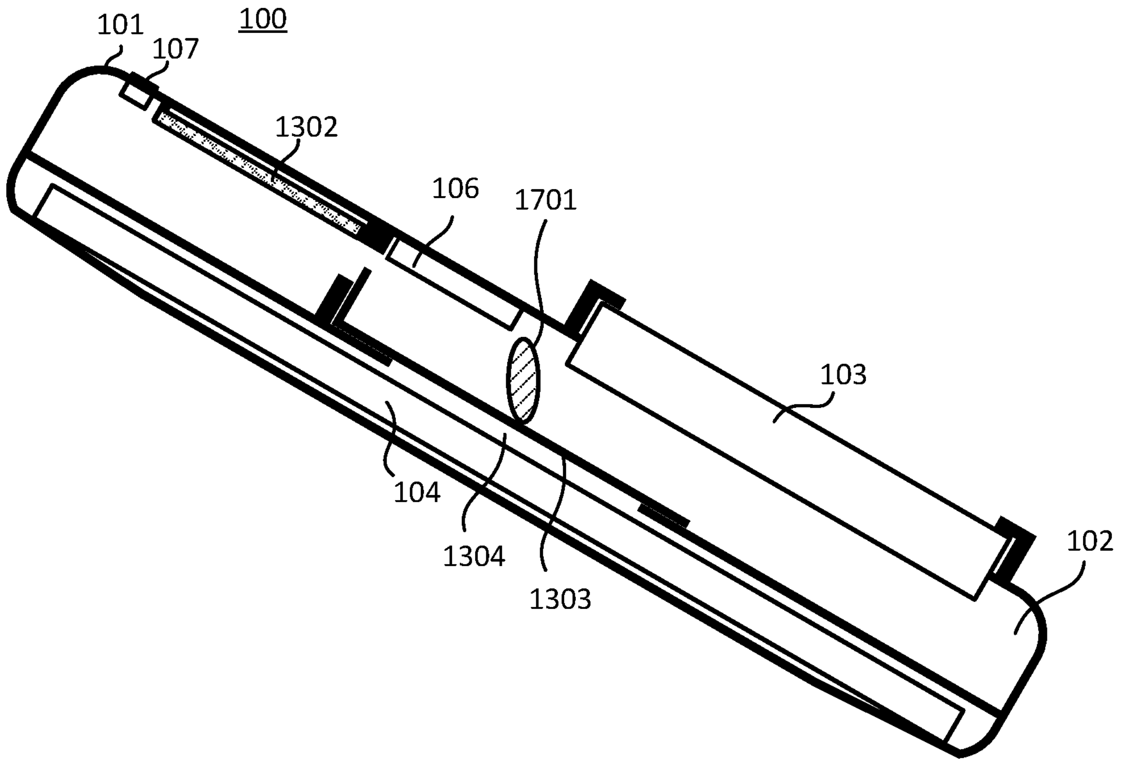
FIG. 14 is a side view of the device of FIG. 13 in a second configuration.

FIGS. 13 and 14 are side views of another example of device 100 in first and second device modes, respectively. In this example, device 100 may include both passive radiator 1302 and acoustic structure 104, where valve 1303 may be configured to selectively either allow acoustic energy from driver 103 to freely be received by acoustic structure 104 while substantially blocking the acoustic energy from being received by passive radiator 1302, or substantially block the acoustic energy from being received by acoustic structure 104 while also allowing the acoustic energy to freely be received by passive radiator 1302. To accomplish this, passive radiator 1302 has been moved to the top of device 100 and valve 1303 is shown as having an L-shape, however any positioning of passive radiator 1302 and/or acoustic structure 104, and any configuration of valve 1303, may be used as desired that accomplishes this functionality. As in the operation of valve 1303 with respect to passive radiator 1302, such a configuration may allow device 100 to selectively enable or disable (or otherwise modulate the functionality of) both acoustic structure 104 and passive radiator 1302 based on device mode (e.g., based on device geometry and/or user input via user interface device 2101). Thus, for example, at least one device mode may enable acoustic structure 104 while disabling passive radiator 1302, and at least one other device mode may disable acoustic structure 104 while enabling passive radiator 1302.

While some of the drawings show examples of device 100 having particular features such as a particular housing shape, one or more acoustic structures, a passive radiator, one or more speaker drivers, one or more microphones, one or more swiveling arms, one or more valves, one or more sensors, one or more cams, wiring, and/or a controller, and other drawings may not, their absences from particular drawings is not meant to imply that those features are not present in those examples. Any of the device 100 examples described and illustrated herein may include any of these and the other features described herein, in any combination or subcombination. For example, while device modes are described particularly with respect to certain examples of device 100, any of the device 100 examples described and illustrated herein may be configured to operate in various device modes in the manner described. Also, while particular housing 101 shapes are illustrated in particular examples of device 100, any of the device 100 examples may use any housing shape.

More generally, although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. An apparatus comprising:

a main body comprising a first microphone; and a moveable portion comprising a second microphone, wherein the moveable portion is connected to the main body and configured to move with respect to the main body while remaining connected to the main body, wherein movement of the moveable portion causes the apparatus to switch between a first mode and a second mode;

a speaker; and a passive radiator configured to receive acoustic waves produced by the speaker, wherein in the first mode of the apparatus the speaker is enabled and the passive radiator is enabled, and in the second mode of the apparatus the speaker is enabled and the passive radiator is disabled, wherein in one of the first mode or the second mode, the first microphone is enabled and the second microphone is disabled, and wherein in the other of the first mode or the second mode, the first microphone is disabled and the second microphone is enabled.

2. The apparatus of claim 1, wherein the first microphone comprises an omnidirectional microphone and the second microphone comprises a directional microphone.

3. The apparatus of claim 1, further comprising a signal processor, wherein the signal processor is configured to generate processed electrical signals, comprising processing electrical signals comprising acoustic information in a first manner while the apparatus is in the first mode and in a second manner while the apparatus is in the second mode, and wherein the apparatus is configured to provide the processed electrical signals to the speaker.

4. The apparatus of claim 1, further comprising:

a signal processor, wherein the signal processor is configured to process electrical signals in a first manner while the apparatus is in the first mode and in a second manner while the apparatus is in the second mode.

5. The apparatus of claim 1, further comprising:

a signal processor, wherein the signal processor is configured to perform acoustic echo cancellation in a first manner while the apparatus is in the first mode and in a second manner while the apparatus is in the second mode.

6. An apparatus comprising:

a main body comprising a speaker;

an acoustic structure;

a moveable portion connected to the main body and configured to move with respect to the main body, while remaining connected to the main body, between at least a first position in which the apparatus is in a first mode and a second position in which the apparatus is in a second mode;

a member configured to selectively cover and uncover at least a portion of the acoustic structure; and a cam configured to, in response to movement of the moveable portion, move the member to cover the at least the portion of the acoustic structure while the moveable portion is in the first position and to uncover the at least the portion of the acoustic structure while the moveable portion is in the second position.

7. The apparatus of claim 6, wherein the acoustic structure comprises a passive radiator.

8. The apparatus of claim 6, wherein the moveable portion is configured to rotate with respect to the main body between the first position and the second position.

9. The apparatus of claim 6, wherein the moveable portion comprises a microphone, and wherein the microphone is configured to be enabled when the moveable portion is in the first position and to be disabled when the moveable portion is in the second position.

10. The apparatus of claim 6, wherein:

the main body comprises a first microphone that is in a fixed location with respect to the speaker; and the moveable portion comprises a second microphone that is in:

a first location with respect to the speaker when the moveable portion is in the first position; and a second location with respect to the speaker, different from the first location with respect to the speaker, when the moveable portion is in the second position.

11. An apparatus comprising:

a main body comprising:

a first microphone; and a speaker; and a moveable portion, connected to the main body and configured to move with respect to the main body while remaining connected to the main body, comprising:

a first portion that extends completely around a perimeter of the main body;

a second portion that extends at least partially within the main body; and a second microphone, wherein the apparatus is configured such that movement of the moveable portion causes the apparatus to switch between a first mode and a second mode, wherein the apparatus is configured to enable the first microphone and disable the second microphone when in the first mode, and wherein the apparatus is configured to disable the first microphone and enable the second microphone when in the second mode.

12. The apparatus of claim 11, wherein the first microphone is an omnidirectional microphone and the second microphone is a directional microphone.

13. The apparatus of claim 11, wherein the apparatus is configured to operate as a speakerphone in the first mode and as a personal audio device in the second mode.

14. The apparatus of claim 11, further comprising a signal processor configured to apply at least one signal processing parameter that is based on whether the apparatus is in the first mode or the second mode.

15. The apparatus of claim 11, wherein the moveable portion is in mechanical communication with a switch that is configured to switch the first microphone between being enabled and disabled.

16. An apparatus comprising:

a speaker;

one or more microphones;

a passive radiator configured to receive acoustic waves produced by the speaker, wherein in a first mode of the apparatus the speaker is enabled and the passive radiator is enabled, and in a second mode of the apparatus the speaker is enabled and the passive radiator is disabled; and a signal processor, wherein the signal processor is configured to perform, using electrical signals received from the one or more microphones, acoustic echo cancellation in a first manner while the apparatus is in the first mode and in a second manner while the apparatus is in the second mode.

17. The apparatus of claim 16, wherein the one or more microphones comprises a first microphone, and wherein:

in one of the first mode or the second mode, the first microphone is enabled; and in the other of the first mode or the second mode, the first microphone is disabled.

18. The apparatus of claim 16, wherein the one or more microphones comprises a first microphone and a second microphone, and wherein:

in one of the first mode or the second mode, the first microphone is enabled and the second microphone is disabled; and in the other of the first mode or the second mode, the first microphone is disabled and the second microphone is enabled.

19. The apparatus of claim 16, further comprising:

a main body; and a moveable portion connected to the main body and configured to move with respect to the main body while remaining connected to the main body, wherein movement of the moveable portion causes the apparatus to switch between the first mode and the second mode.

* * * * *